(12) United States Patent
Wilson et al.

(10) Patent No.: US 7,099,942 B1
(45) Date of Patent: Aug. 29, 2006

(54) SYSTEM AND METHOD FOR DETERMINING SERVICE REQUIREMENTS OF NETWORK ELEMENTS

(75) Inventors: Steven E. Wilson, Charlotte, NC (US); William M. Griffin, Charlotte, NC (US); Rod S. Kelley, Antioch, TN (US)

(73) Assignee: BellSouth Intellectual Property Corp., Wilmington, DE (US)

(*) Notice: Subject to any disclaimer, the term of this patent is extended or adjusted under 35 U.S.C. 154(b) by 624 days.

(21) Appl. No.: 10/012,495

(22) Filed: Dec. 12, 2001

(51) Int. Cl.
*G06F 15/173* (2006.01)
*G06F 11/00* (2006.01)

(52) U.S. Cl. ............ 709/224; 709/223; 709/240; 714/47

(58) Field of Classification Search ........ 709/223–226, 709/240; 714/47; 715/736
See application file for complete search history.

(56) References Cited

U.S. PATENT DOCUMENTS

| | | | | |
|---|---|---|---|---|
| 5,537,653 A | | 7/1996 | Bianchini, Jr. | |
| 5,819,028 A | * | 10/1998 | Manghirmalani et al. | 714/57 |
| 5,905,868 A | * | 5/1999 | Baghai et al. | 709/224 |
| 5,974,237 A | * | 10/1999 | Shurmer et al. | 709/224 |
| 6,061,724 A | * | 5/2000 | Ries et al. | 709/224 |
| 6,067,407 A | | 5/2000 | Wadsworth et al. | |
| 6,148,335 A | * | 11/2000 | Haggard et al. | 709/224 |
| 6,321,338 B1 | * | 11/2001 | Porras et al. | 713/201 |
| 6,571,285 B1 | * | 5/2003 | Groath et al. | 709/223 |

* cited by examiner

*Primary Examiner*—Zarni Maung
*Assistant Examiner*—El Hadji M. Sall
(74) *Attorney, Agent, or Firm*—Withers & Keys, LLC (57) ABSTRACT

A system and method for determining service requirements of elements in a network. A collection program is used to gather performance data from an element for which a service requirement is desirable by an entity. The performance data is stored in a database. The performance data is then retrieved by a microprocessor. The microprocessor processes the performance data to calculate a network health indicator associated with the performance data. Using the network health indicator, a service requirement of the associated element can be determined. When at least two network health indicators or service requirements of different elements are compared, service priorities among the elements can be established.

36 Claims, 4 Drawing Sheets

SYSTEM AND METHOD FOR DETERMINING SERVICE REQUIREMENTS OF NETWORK ELEMENTS

BACKGROUND

1. Field of the Invention

The present invention relates to network resources management, and more particularly, to a system and method for determining service requirements of individual elements in a network.

2. Background of the Invention

In a network that has a large number of elements, it can be difficult to determine which element or elements require service. For example, in a telephone network that has thousands of switches and other network elements, it is difficult to determine which of the network elements require maintenance to keep the element functioning within design tolerances. Furthermore, it can be nearly impossible to prioritize which switches need service more urgently than the other switches.

In the 1970's, Bell Laboratories (now Lucent Technologies) had a product called Network Switching Performance Measurement Plan (NSPMP). The NSPMP helped monitor network element performance. The NSPMP provided support to a limited number of telephone switches including the 1ESS, 1AESS, 2ESS, 2BESS, 3ESS, 5ESS, and DMS100 switches.

NSPMP is no longer supported by Lucent Technologies. Many users discontinued the use of the product because it was not user friendly. Other users found that the time and efforts associated with using the NSPMP outweighed the benefits received from the product. Currently, NSPMP simply does not have the capability to monitor the performance of a majority of the switches that are being used in telephone networks, due to increased sophistication and complexity of the switches. For example, the NSPMP does not have provisions for non-Lucent switches and AIN components such as service control points.

SUMMARY OF THE INVENTION

The present invention uses a microprocessor together with collection programs or instruction sets to collect performance data from network elements whose service requirements are needed. The microprocessor calculates a network health indicator for an element based at least in part on the performance data collected from that element in accordance with a network health assessment scheme. The network health indicator can be represented as a network health score or a network health index. The network health indicator can be interpreted to determine, among other performance indicators, whether an element is working within established tolerances and whether the element is experiencing an unacceptable number of failures. More importantly, the network health indicator can be used to determine whether the element requires service more urgently than other elements. If an element has two or more components or failure types, then each component is associated with a component score. All component scores are then used to calculate the network health score and the network health index for that element.

In one relatively simple implementation of the invention, the network health assessment scheme for an element can be established as follows. Each failure experienced by the element is assigned a score. For example, a first failure type may be assigned two points for each occurrence of the failure, and a more severe failure type may be assigned ten or more points per failure. An overall network health score of 100 can be used to represent the perfect score, indicating that the element does not require service. From the perfect score of 100, the points associated with each failure of the element is subtracted, resulting in the overall network health score for that element to be lower than 100. A number of index ranges may be established to represent service requirements of the element. For example, a network health score lower than 75 may be established as the floor to indicate that an unacceptable condition has occurred at the element, and a service call must be made immediately. On the other hand, a network health score in the range of, for example, between 75 and 85, may be used to indicate that the element requires service, but that service need not be performed immediately. Also, a comparison of two or more network health scores associated with different elements can be used to prioritize which element requires service more urgently than the other elements.

Preferably, the network health assessment scheme uses a more sophisticated calculation method. In a specific implementation of the invention, the network health index of an element is a function of component scores reported by various components associated with that element. For illustration purposes, assume that an element has four components, namely, Components A, B, C, and D, which are associated with maximum component scores of 10, 20, 30, and 40, respectively. If none of the components fails during a measuring period, the overall score for the element equals to 100, which is the sum of all maximum component scores. The network health index is then calculated to be 1.00 (100/100). Assume further that during a measuring period, Components A, B, C, and D report failure to base count ratios of 0.02, 0.03, 0.04, and 0.05, respectively. The base count is the total number of attempts made. These ratios are used to retrieve associated component indices from a reference table. Assume that the reference table provides that the component indices for the ratios of 0.02, 0.03, 0.04, and 0.05 are 0.98, 0.97, 0.96, and 0.95, respectively, then the component score for each component is the product of the component index and the maximum component score. Thus, Components A, B, C, and D in this example would have component scores of 9.8 (0.98×10), 19.4 (0.97×20), 28.8 (0.96×30), and 38 (0.95×40), respectively. The overall or bottom line score (the network health score) for that element would be the sum of all the component scores. In this example, the network health score for the element would be 96 (9.8+19.4+28.8+38). The network health index can be expressed in terms of the network health score divided by total possible score as reported. In this example, since all four components reported, the total possible points from Components A, B, C, and D add up to 100 so the network health index is 0.96 (96/100). If, however, Component D does not report its component score during the measuring period, then the overall score would be 58 (9.8+19.4+28.8) and the total possible points would be 60 (10+20+30). Therefore, if Component D does not report, the network health index of the element would be 0.97 (58/60).

In other words, the component score is a function of the failure to base count ratio and a component index obtained from a reference table. The base count may be, for example, the number of attempts made by the component in executing tasks. The ratio is then used to consult the reference table to make an assessment as to how that failure type or component performed. The reference table returns the component index for this component and the number of points this component gets toward the network health index for this network element. The reference table is prepared based on historical data associated with the element. For example, if the failure type in question is a 15-point component for the element in the network, a complete failure of the component (ratio=1) would result in a subtraction of all 15 points from the overall score for the element. On the other hand, if the element experiences very few failures of this type during the measuring period to yield a very low failure to base count ratio, which relates to a high component index, e.g., 0.98, then the component score would be 14.7 points (98% of the total 15 points). This component score is then added to the element's overall score to calculate its network health index. Using this calculation method, each different component is weighted differently with the maximum number of points. However, the total maximum points for all components can only equal to 100.

In a preferred embodiment involving a telephone network having a large number of switches and other elements, the network health indicator for each element is used to determine the "health" or performance status of the element. In the telephone network, the invention can be adapted to collect performance data from nearly 1,000 switches and other network elements. The performance data can include, for example, information related to types of failures or number of failures experienced by the network elements each day.

The performance data for each network element is preferably collected by a collection program that is associated with the network element. For example, the present invention may use the collection program written or provided by the manufacturer of the element. The collection program may also be one that which is developed and adapted by the network. The collection program is preferably written in the well known C programming language. Calculation programs associated with the collection program are preferably written in Oracle PLSQL. The performance data collected from each network element is stored in a database. The database is preferably an Oracle database.

Each collection program is in communication with the microprocessor of a server computer that is adapted to implement the invention. The microprocessor executes instructions sets or a computer program to retrieve the performance data for the network elements and calculates a network health score and/or a network health index for each of the elements. In one specific implementation of the present invention in a telecommunication services network, the network health indicator is a function of a ratio of the number of failures experienced by an element, e.g., a switch, to a base count associated with the switch. The base count may be, for example, the total number of calls handled by that switch for the performance or measuring period. A look-up table can be consulted to determine whether the network heath indicator is within acceptable tolerances. If it is out of tolerance, then service is considered required for that switch. The lookup table can be developed based on the historical data of the switches.

Calculation of the network health indicator is preferably performed on a regular interval. For example, the calculation may done on a daily basis. Preferably, the network health indicator is calculated on a monthly basis. The network health indicator can then be provided to another system or to an entity affiliated with the network. For example, the network health indicator can be provided to a work force management system that feeds tickets to technicians, notifying the technicians of service requirements of the element.

Thus, each network health indicator can be used to determine the health or service requirement of the associated network element. The performance data and the network health indicator can be made available to designated network personnel on a computer network. The computer network may be, for example, a company Intranet. Preferably, Macromedia's Cold Fusion and the HTML are utilized to enable dynamic data presentation. The network health indicator can be used to provide direction for maintenance operation in a network reliability center as well as field forces.

In a telephone network, the network health indicator can be provided to one or more entities or departments affiliated with the telephone network. For example, the network health indicator can be provided to the field work group forces (FWG), the network infrastructure support center (NISC, which is also known as software provisioning center), and to the network reliability center (NRC). In addition to indicating a service requirement of an element, the network health indicator can serve as a resource for these entities or departments to assess how they are performing.

The network health indicator can also be used as an automated work driver for the NRC of the telephone network, providing a focused maintenance tool to the NRC. In conjunction with the Integrated NRC Tool System (INTS) ticketing system, the network health indicator can generate trouble tickets and exception reports to the NRC technicians. These trouble tickets and reports are prioritized and based on the network health indicator of the network elements. This allows for the work to be prioritized based on the network health indicator for the network element. Using network health indicator as a work driver provides the advantage to the NRC that the network elements performing the worst, per the network health indicator, will be addressed first by the maintenance personnel.

DETAILED DESCRIPTION OF THE INVENTION

Figure 1:
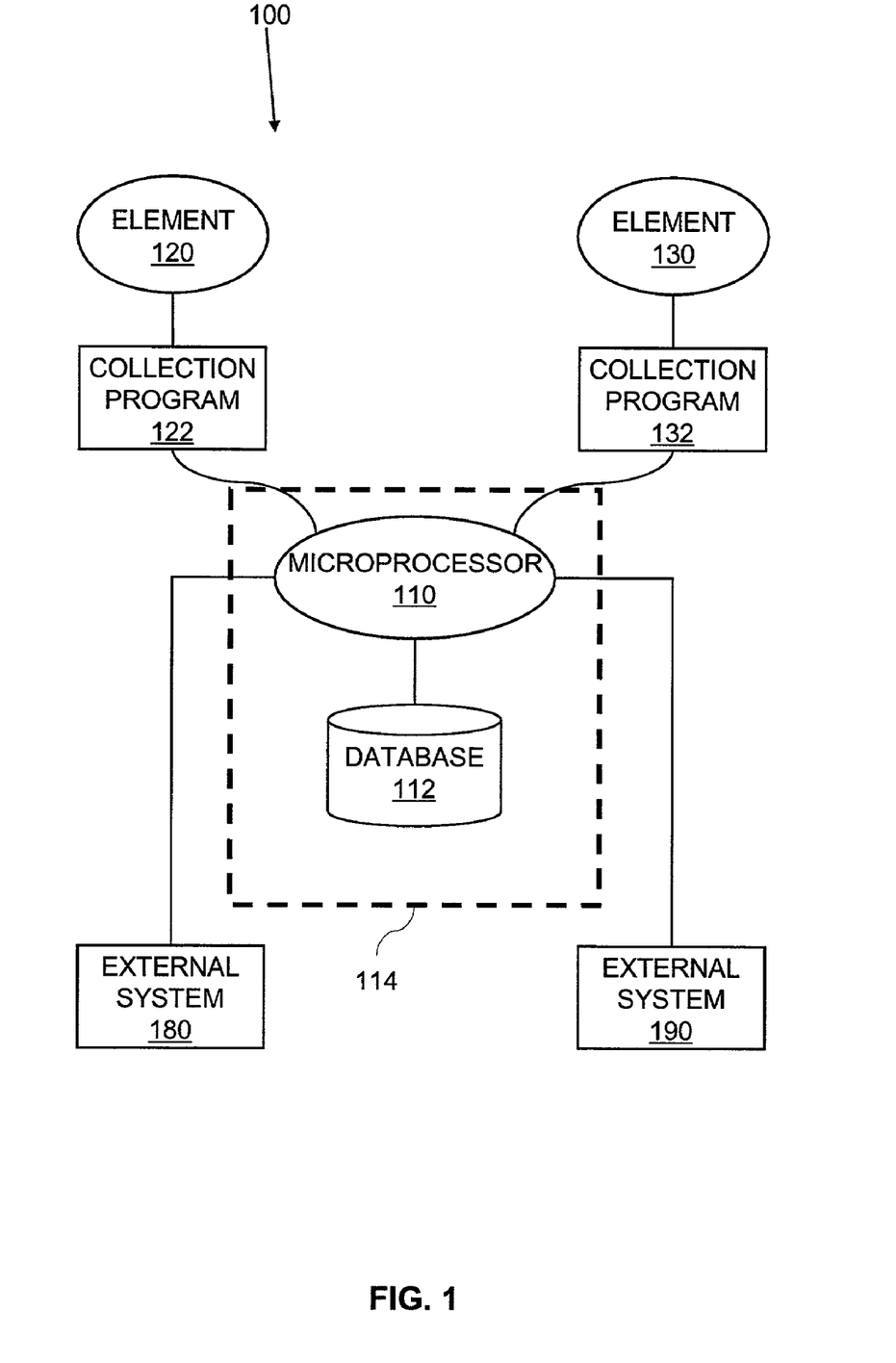
FIG. 1 is a schematic diagram showing a system architecture of an exemplary implementation of an embodiment of the invention.

FIG. 1 is a schematic diagram showing a system architecture of an exemplary implementation of an embodiment of the invention. Network 100 has many elements, which include elements 120 and 130. It must be understood that network elements 120 and 130 are representative of a much larger number of network elements that make up network 100. Microprocessor 110 is in communication with each of the network elements, including elements 120 and 130. Database 112 is accessible by microprocessor 110. Preferably, both microprocessor 110 and database 112 are part of the same host computer 114 that is adapted to implement the present invention. However, database 112 may be stored on a separate computer in communication with microprocessor 110.

Collection program 122 is adapted to collect performance data from element 120 and to provide the performance data to microprocessor 110. Similarly, collection program 132 is adapted to collect performance data from element 130 and to provide the performance data to microprocessor 110. Collection programs 122 and 132 may be residing at elements 120 and 130, respectively. Collection programs 122 and 132 may be provided by manufacturers of elements 120 and 130 or may be provided by the operators of network 100. One or both collection programs 122 and 132 may reside in host computer 114 where microprocessor 110 is located. One or both collection programs 122 and 132 may be customized programs adapted specifically for the purposes of the present invention.

Network 100 may be a computer network. For example, network 100 may be a local area network (LAN) or a wide area network. Elements 120 and 130 can be, for example, computers or peripherals (e.g., printers, scanners, and the like) associated with network 100. In a specific example in which network 100 is a telephone network, elements 120 and 130 may be, for example, two switches. In that example, each switch is basically a computer on its own because, as known in the art, switches generally include a microprocessor.

Microprocessor 110 is in communication with database 112. Microprocessor 110 is adapted to receive the performance data collected by each of the collection programs 122 and 132. Microprocessor 110 can store the performance data received from collection programs 122 and 132 in database 112. Similarly, microprocessor 110 can retrieve the performance data from database 112. Further, microprocessor 110 can manipulate the performance data to calculate network health indicator, which can be represented as scores and indices, for elements 120 and 130.

External systems 180 and 190 are in communication with microprocessor 110. Microprocessor 110 is adapted to supply the network health indicator of elements 120 and 130 to one or more external systems 180 and 190. In a telecommunications network, one or more external systems 180 and 190 may be, for example, a work force administration system, an intranet, an INTS, an NRC, a FWG, and a NISC. The Intranet can be used to provide the FWG and higher management with reports identifying network health. Individual network health indicator can be combined to produce an executive summary for the entire network. The executive summary can be organized by a turf, area, or region associated with a management entity.

External systems 180 and 190 are accessible by a number of entities. For example, a service technician may access external systems 180 and 190 to determine which of elements 120 and 130 requires service. Specifically, the service technician may compare the network health indicator of elements 120 and 130 to determine which of elements 120 and 130 requires service more urgently than the other element. It is noted that more than two external systems can be adapted to utilize the network health indicator.

Figure 2:
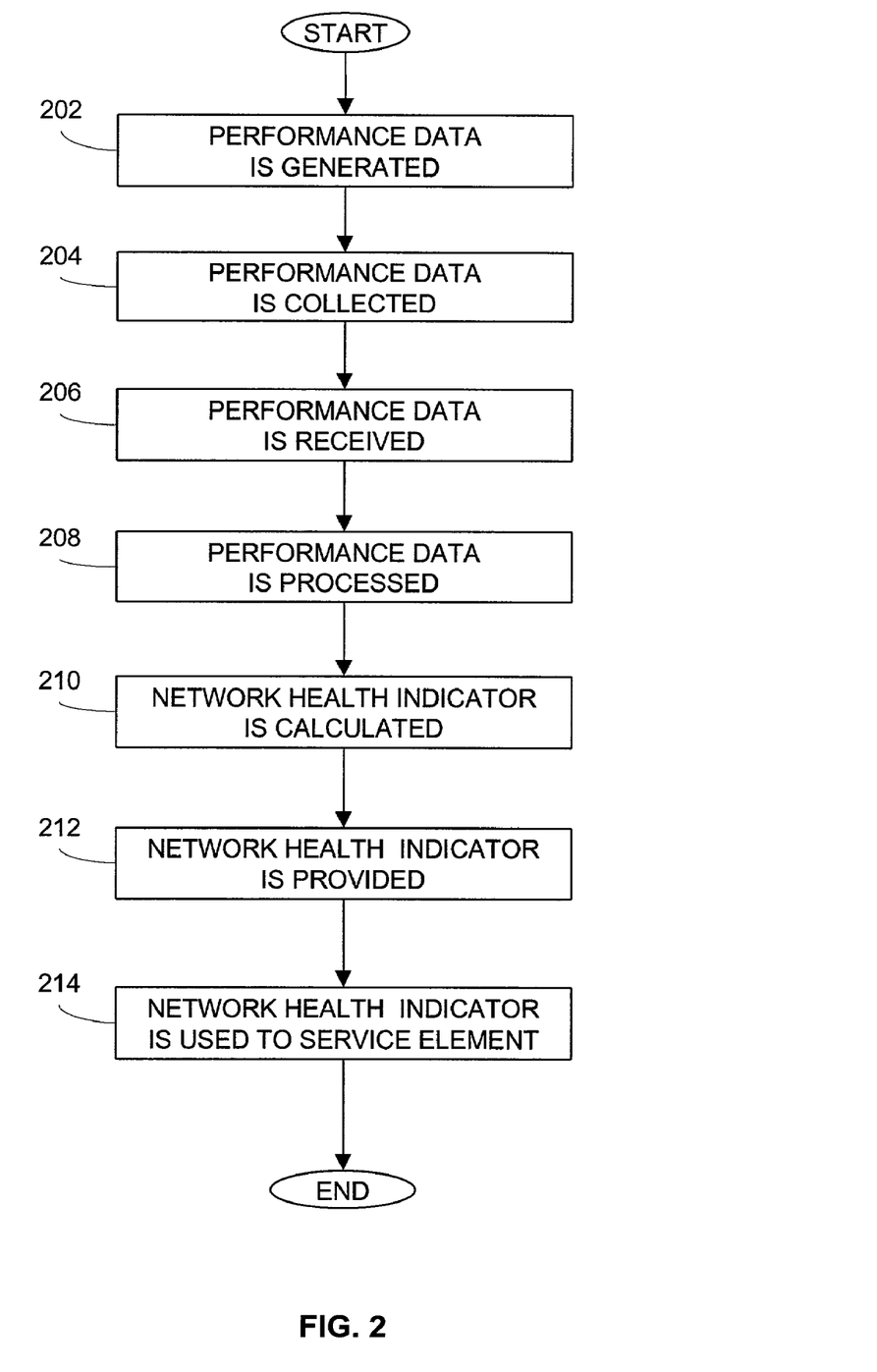
FIG. 2 is a flowchart illustrating exemplary steps used to implement an embodiment of the invention.

FIG. 2 is a flowchart illustrating exemplary steps involved in using an embodiment of the invention.

In step 202, as each of elements 120 and 130 operates or plays its role in network 100, performance data associated with its performance characteristics is generated. The performance data can relate to, for example, whether the element is operating within established tolerances. If an element is not performing as designed or as intended, i.e., the element fails, then the performance data would so indicate. As each element in network 100 may perform different functions, the performance data for element 120 may be different from the performance data for element 130.

In step 204, the performance data for elements 120 and 130 are collected by collection programs 122 and 132, respectively. Collection may be performed at regular intervals. For example, collection programs 122 and 132 may be adapted to collect performance data on a daily basis. Alternatively, the performance data may be collected as failures or inadequate performances of elements 120 and 130 are detected. Because the performance data for elements 120 and 130 may differ from each other, collection program 122 and 132 may be different as well.

In step 206, the performance data is received by microprocessor 110. The performance data associated with elements 120 and 130 can be transmitted by elements 120 and 130, respectively. Alternatively, microprocessor 110 may be adapted to request and/or retrieve the performance data from elements 120 and 130.

In step 208, the performance data is processed by microprocessor 110. Processing of the performance data is preferably based on an established network health assessment scheme. Element 120 is evaluated using a first network health assessment scheme and element 130 is evaluated using a second network health assessment scheme. However, the first and second schemes would likely be identical if elements 120 and 130 are identical (but may not be, for example, if elements 120 and 130, even though they are identical, are used in very different contexts). On the other hand, the first and second schemes would be different if elements 120 and 130 are different.

The first network health assessment scheme may process the performance data of element 120 based on the number of times element 120 fails within a measuring period. The measuring period may be as long as, for example, 24 hours, seven days, or one month. The measuring period could also be, for example, one hour, three hours, or six hours.

In step 210, a network health score is calculated for each of elements 120 and 130. If element 120 does not fail within the measuring period, then its network health score would be 100. On the other hand, if element 120 fails five times during the same measuring period, then the overall score could be calculated to be 95, assuming that each failure reduces the network health score by one point (i.e., assuming that each failure is a relatively low-level failure that is only assigned a 1-point penalty). For example, if one failure is a severe failure which is assigned a 15-point penalty, a second failure is a moderate failure assigned a 5-point penalty, and the other three failures are minor 1-point penalty failure), network element 120 would have a network health score of 77. Using the network health score, the service requirement of element 120 may be accessed and prioritized. Table 1 below represents an exemplary service schedule for element 120 relating the calculated network health score to a service requirement.

TABLE 1

Exemplary Service Requirements of Element 120

| Ranges of Calculated Network Health Score, x | Health Categories | Service Requirements |
| --- | --- | --- |
| x = 100 | Healthy | No service is required |
| 95 ≦ x < 100 | Tolerable | Need service within the next seven days |
| 90 ≦ x < 95 | Acceptable | Need service within the next three days |
| 85 ≦ x < 90 | Unhealthy | Need service within the next 24 hours |
| x < 85 | Unacceptable | Need service immediately |

The second network health assessment scheme for element 130 may be different. For example, a first kind of failure may be assigned three point per failure, and a second kind of failure may be assigned seven points per failure. Therefore, if element 130 experienced three first-kind failures and three second-kind failures within the measuring period, then its network health score may be calculated as follows: $100-(3\times3)-(3\times7)=100-9-21=70$. Using the network health score, the service requirement of element 130 may be determined and prioritized. Table 2 below represents an exemplary service schedule for element 130 associating a calculated network health score to a service requirement.

TABLE 2

Exemplary Service Requirements of Element 130

| Ranges of Calculated Network Health Score, y | Health Categories | Remarks |
|---|---|---|
| y = 100 | Healthy | No service is required |
| 90 ≤ y < 100 | Tolerable | Need service within the next seven days |
| 80 ≤ y < 90 | Acceptable | Need service within the next three days |
| 70 ≤ y < 80 | Unhealthy | Need service within the next 24 hours |
| y < 70 | Unacceptable | Need service immediately |

Thus, if element 120 has a network health score, x=95, despite the failures experienced, element 120 is considered to be in the "Tolerable" category as shown in Table 1, and the service can be scheduled to be performed within the next seven days. On the other hand, if element 130 has a network health score, y=69, which is indicated in Table 2 as "Unacceptable," then service must be provided to element 130 immediately. A comparison between x and y would indicate that element 130 requires service more urgently that element 120 does.

It is noted that other network health assessment schemes may be used. For example, a lookup table may be established based on historical performance data of an element. The lookup table may associate, for example, ranges of network health score with a ratio of failures to total attempts made by the element. In the context of a switch in a telephone network, the ratio can be the number of failed connections to the total number of connections attempted by the switch. Table 3 below is an exemplary lookup table using this network health assessment scheme.

TABLE 3

Exemplary Service Requirements Using Historical Data

| Ranges of Calculated Network Health Score, z | Ratio of Failures to Total Attempts | Remarks |
|---|---|---|
| z = 100 | No failure | No service is required |
| 85 ≤ z < 100 | Greater than zero but less than 0.005 | Need service at next scheduled visit |
| z < 85 | Greater or equal to 0.05 | Need service immediately |

Using this network health assessment scheme, a service is immediately made if the network health score is less than 85, indicating 50 or more failures per 1,000 attempts have occurred at the element. However, if fewer than 50 failures per 1,000 attempts have occurred, then service will not be provided to that element until the next regularly scheduled visit. In other words, the element will receive its regularly scheduled service when fewer than 50 failures per 1,000 attempts have occurred, but a service is immediately made when 50 or more failures have occurred per 1,000 attempts.

In step 212, each of the network health scores is provided to one or more external systems 180 and 190. Again, microprocessor 110 can be adapted to automatically provide the network health scores to external systems 180 and 190 without requests from external systems 180 and 190. Alternatively, microprocessor 110 can be adapted so that it provides the network health scores only when it is requested to do so by external systems 180 and 190.

In step 214, each network health score is used by external systems 180 and 190 to service the associated element. Given the above disclosure, it is clear that a large number of different network health assessment schemes in addition to those illustrated in Tables 1 to 3 can be developed for the purposes of servicing elements 120 and 130. Using the health categories, such as those indicated in Tables 1 through 3, service requirements and service priority for each elements in network 100 can be established.

Figure 3:
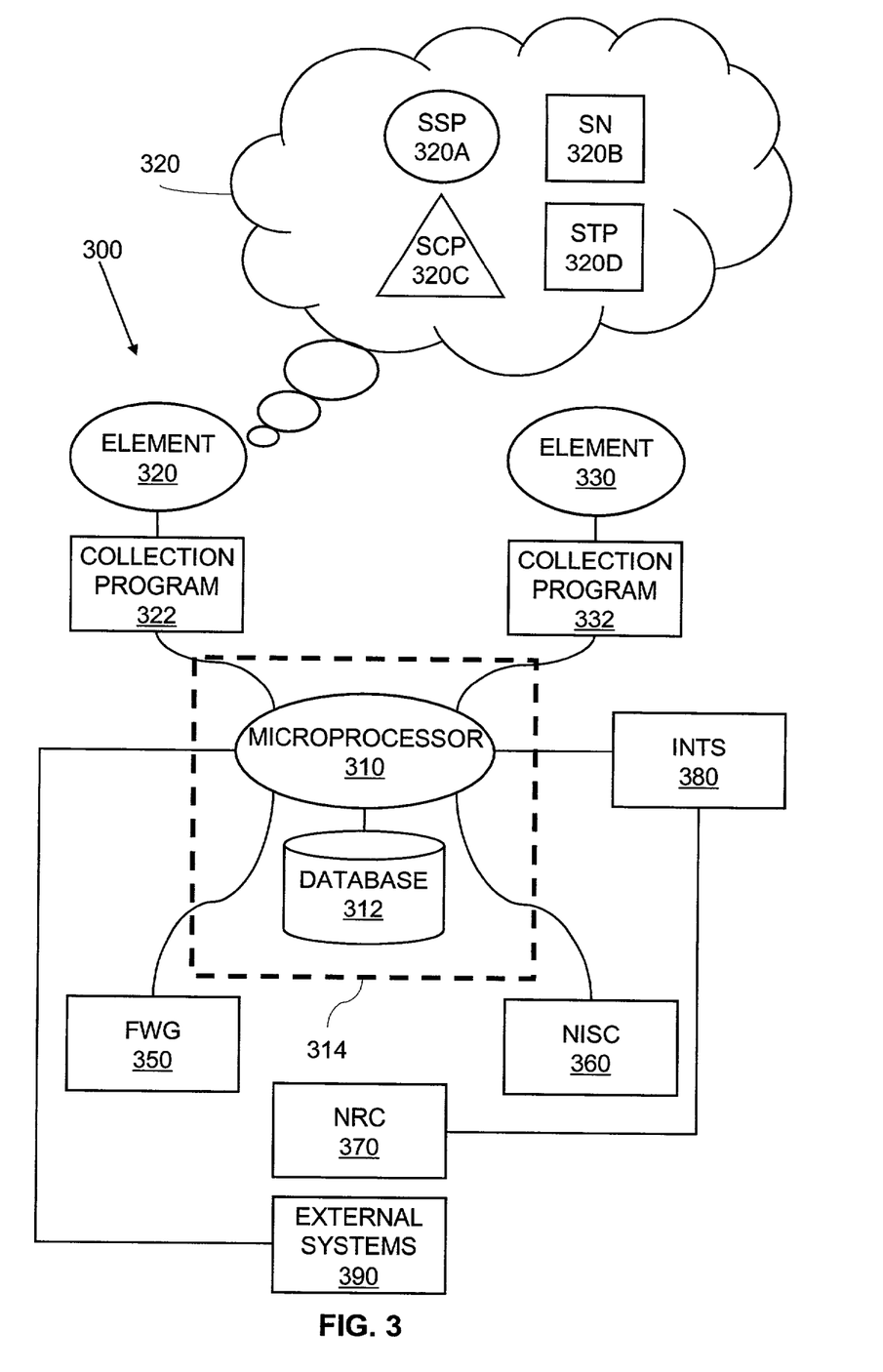
FIG. 3 is a schematic diagram showing a system architecture of an embodiment of the invention adapted for a telephone network.

FIG. 3 is a schematic diagram showing a system architecture of another embodiment of the invention that is adapted for a telephone network. Telephone network 300 has a number of network elements. For clarity, only elements 320 and 330 are shown in FIG. 3 even though telephone network 300 may have hundreds or even thousands of such elements. Elements 320 and 330 may be, for example, service switching point (SSP) 320A or other switches such as the 1AESS and 5ESS switches made by Lucent Technologies, DMS100 and DMS10 switches made by Nortel Networks, and DCO and EWSD switches made by Siemens. Elements 320 and 330 may also be other network elements such as an SS7 component, e.g., signal transfer point (STP) 320D. Furthermore, elements 320 and 330 may be units of an advanced intelligent network (AIN) such as service control point (SCP) 320C or service node (SN) 320B.

Each of elements 320 and 330 has an associated collection program, such as collection programs 322 and 332, respectively. Collection programs 322 and 332 collect performance data associated with elements 320 and 330, respectively. Collection programs 322 and 332 may be provided by manufacturers of elements 320 and 330 or may be provided by the operators of network 300. Collection programs 322 and 332 preferably run once a day. Collection programs 322 and 332 can preferably filter specific messages from an operational support system host log (in the case of NFM) or from an element communicator log (in the case of NMA). The NFM is the Network Fault Monitoring system of Lucent and the NMA is the Network Monitoring and Analysis system of Telcordia. Each specific network element type requires a different message pattern. The messages collected are forwarded to handler programs that extract specific items to build loader files for input into database 312. The loader files are then passed across the network to the network health host server, which is depicted as host computer 314 in FIG. 3.

Microprocessor 310 is in communication with each of the elements in network 300, including elements 320 and 330. Preferably, microprocessor 310 is adapted to receive the performance data collected by each of the collection programs 322 and 332. Microprocessor 310 has access to database 312. Microprocessor 310 can, for example, store the performance data received from collection programs 322 and 332 in database 312. Similarly, microprocessor 310 can retrieve the performance data from database 312. Further, microprocessor 310 can manipulate the performance data associated with each of elements 320 and 330 to transform it to a network health index for each of the elements 320 and 330. Microprocessor 310 and database 312 are preferably components of host computer 314.

Microprocessor 310 is in communication with a number of external systems. For example, microprocessor 310 is in communication with field work group forces (FWG) 350, software provisioning center (NISC) 360, network reliability center (NRC) 370, INTS 380, and other external systems 390. It is noted that external systems 390 may be any other systems that can receive network health index of the present invention. External systems 390 can include, for example, a work force administration system. For convenience, FWG 350, NISC 360, NRC 370, INTS 380 and external systems 390 are collectively referred to hereinafter as external systems. NRC 370 uses network health indices sent to INTS 380 to produce tickets daily to technicians of NRC 370. The tickets point to areas or elements that need analysis or maintenance work done. NRC 370 can also use reports generated based on the network health index to provide information related to, for example, historical performance of specific elements and those elements most in need of service. FWG 350 can use the reports to identify how their network elements are doing and to review check executive summary reports that group individual network elements by one or more of turfs, areas, and regions. NISC 360 can use the network health index for other purposes.

As discussed above, the performance data associated with each of elements 320 and 330 is collected by collection programs 322 and 332, respectively. The performance data is then stored in database 312. Database 312 may be hereinafter referred to as the network health index database or the NHI database. Database 312 can be adapted to maintain at least one year of network health index history. Longer or shorter periods of network health index history may be maintained. Preferably, collection programs 322 and 332 are applications that run on a scheduled basis and reside on TSM (Total Networking Monitoring-Surveillance Module) platforms. TSM microprocessors associated with collection programs 322 and 330 have high speed/high capacity that run applications to log messages from the network elements and to provide routine analysis and alarm alerting. TSM microprocessors are preferably Unix based.

Figure 4:
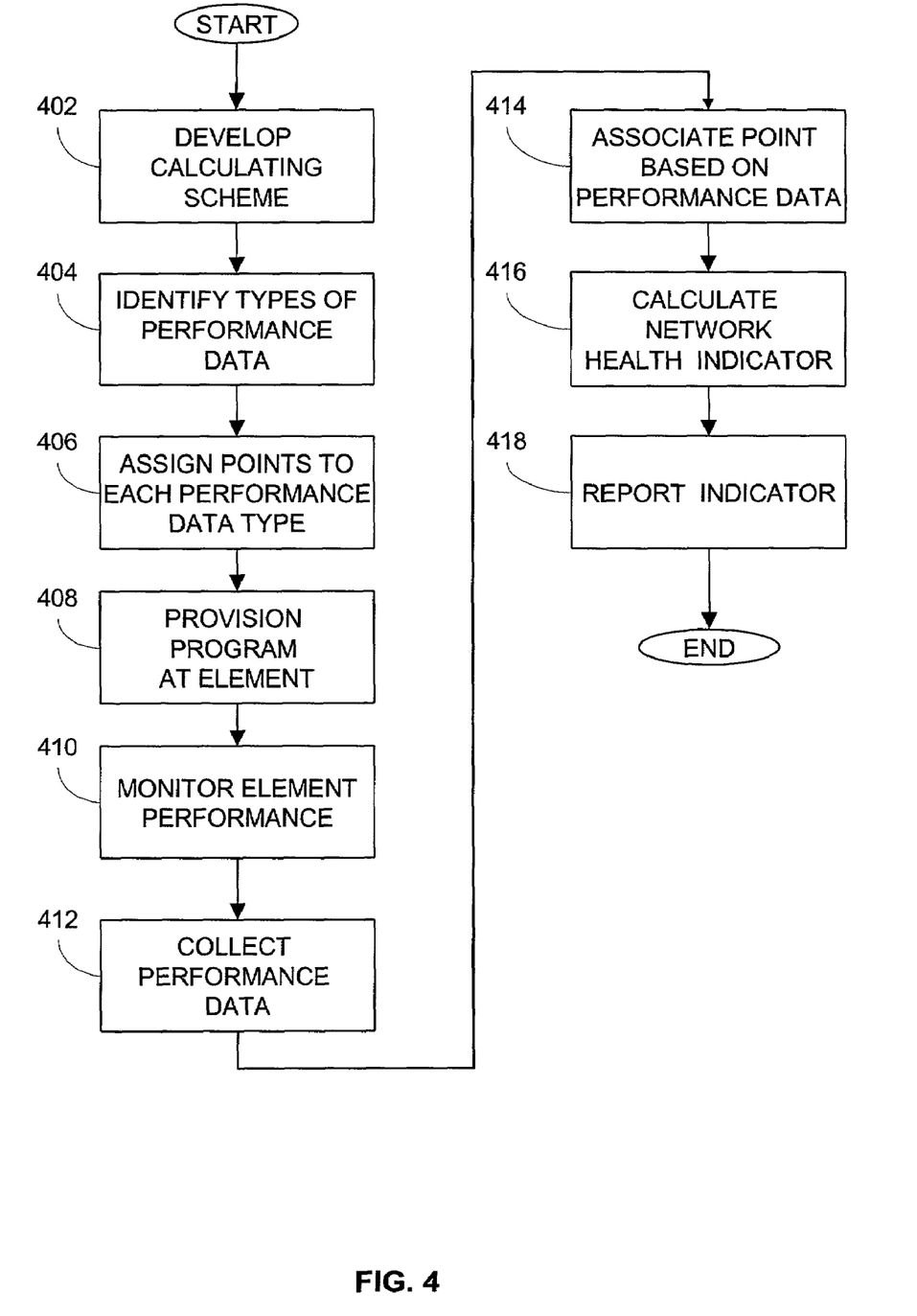
FIG. 4 is a flowchart illustrating exemplary steps involved in using an embodiment of the invention that is implemented on a telephone network.

FIG. 4 is a flowchart illustrating exemplary steps involved in using one embodiment of the invention that is implemented a telephone network.

In step 402, an index calculating scheme or a network health assessment scheme is developed. Preferably, the performance data for this scheme includes information related to one or more criteria summarized in Table 4 below.

TABLE 4

Criteria Related to Types of Performance Data

| Criteria | Remarks |
| --- | --- |
| No. 1 | Those items that impacted, or had the potential to impact, customer service for network 300 |
| No. 2 | Those areas where NRC 370 can provide value through analysis |
| No. 3 | What FWG 350 wants to see in an indexing system |
| No. 4 | Items that could be measured fairly across all vendor products |

In step 404, different types of performance data are identified. Table 5 below illustrates seven exemplary types of performance data that can be collected from elements 320 and 330. Note that each of the performance data types may be associated with one or more of the criteria listed in Table 4 above.

TABLE 5

Types of Performance Data

| Type | Performance Data |
| --- | --- |
| No. 1 | Equipment out of service |
| No. 2 | Software errors |
| No. 3 | Processor and peripheral performance |
| No. 4 | Network faults |
| No. 5 | Code 5s central office equipment |
| No. 6 | SS7 Subsystem Unavailable |
| No. 7 | AIN Measures |

In step 406, each of the seven types of performance data is assigned points or maximum component scores. Tables 6A–6G are specific examples illustrating how points may be assigned to each performance data type. Tables 6A–6G show how points can be assigned for performance data related to "Equipment Out of Service," "Software Errors," "Processor and Peripheral Performance," "Network Faults," "Code 5s Central Office Equipment," "SS7" "Subsystem Unavailable," and "AIN Measures," respectively. Table 7 summarizes Tables 6A–6G. Note that in this specific example, the total points for each performance data equal to 100 as shown on the far right column of Table 7 below.

TABLE 6A

Equipment Out of Service

| Elements | Processor > 24 Hours | Peripheral > 72 Hours | Deferred | Total Points |
| --- | --- | --- | --- | --- |
| 1AESS | 15 points | 10 points | 5 points | 30 |
| 5ESS | 15 points | 10 points | 5 points | 30 |
| DMS100 | 20 points | 10 points | NA | 30 |
| DMS10 | 20 points | 10 points | NA | 30 |
| DCO | 21.25 points | 21.25 points | NA | 42.5 |
| EWSD | 20 points | 20 points | NA | 40 |
| SS7 | 10 points | 10 points | NA | 20 |
| AIN | 10 points | 10 points | NA | 20 |

In Table 6A, the left most column lists seven elements types of telephone network 300. The second column (Processor>24 Hours) and the third column (Peripheral>72 Hours) from the left indicate two types of equipment out of service failures that can be experienced by these elements. The Processor>24 Hours component is the most serious failure type since a duplex failure of more than 24 hours would disrupt service for all customers associated with the switch. The Peripheral>72 Hours component, on the other hand, is a less serious failure type relating to a piece of non-processor equipment that has been in the simplex mode for greater than 72 hours. The potential for customer reports is obvious should the simplex failure escalate to a duplex condition. Duplex failures of a peripheral normally do not affect the entire switch but do impact more than one customer, usually 64 customers or more. The second and third columns indicate the maximum number of points available for Processor>24 Hours and Peripheral>72 Hours components, respectively, assuming a perfect score.

The fourth column from the left shows points associated with Deferred maintenance component of the elements. Note that Table 6A shows that only 1AESS and 5ESS have such maintenance states, which can cause blockage due to reduced capacity. It can also cause customer reports if it inhibits the ability of NRC 370 to make defective equipment busy. This column indicates the maximum number of points available for the component assuming a perfect score.

The last column or the fifth column from the left refers to the total possible points for equipment outage, which is the sum of Processor>24 Hours, Peripheral>72 Hours, and Deferred components.

The equipment out of service measurement is accomplished by the TSM processors associated with collection programs 322 and 332 that query elements 320 and 330 four times a day for equipment out of service. The results of each query are matched against the previous query. If a piece of equipment is out of service on each of the queries for 24 hours for a processor or 72 hours for a peripheral it is marked as exceeding the threshold. Accumulation of out of service hours continues for as long as the equipment remains on the queries. The total hours for each category, Processor>24 Hours and Peripheral>72 Hours, are divided by the quantity of units installed for that category to derive a rate. Deferred equipment, for those switch types that have such a maintenance state, will be expressed as a percentage of available lists full for the particular switch.

The measurement discussed above can be a shared measurement of FWG 350 and NRC 370. Shared measurement for equipment outage means that both NRC 370 and FWG 350 are responsible for the component associated with the measurement. For example, NRC 370 is responsible for identifying that the equipment is out of service, analyzing the fault, recommending a course of action for repair, and tracking its progress, and FWG 350 is responsible for effecting a fix, or actually repairing the equipment.

Table 6B identifies the sub-components by network element type that make up software errors. It shows the sub-components or error types, the maximum points for the error types assuming a perfect score, and the total points for software errors by network element type assuming a perfect score.

Software errors are defined as those faults that are related to switch database problems or operating system troubles. These errors may or may not be service affecting.

Failure messages from the switch are collected daily and divided by the appropriate call volume to come up with a rate of failures in 10,000 calls. The formula for each of the sub-components in software errors can be, for example, a ratio of failures to call volume. Therefore, for 1AESS, for example, applicable formulas can include the following:

Audit count/call volume=results (results=audit index and audit points)

DB00 count/call volume=results (results=DB00 index and DB00 points)

TABLE 6B

Software Errors

| Elements | Error Type 1 | Points | Error Type 2 | Points | Error Type 3 | Points | Total |
|---|---|---|---|---|---|---|---|
| 1AESS | Audits | 3 | DB00 | 1 | TW02 | 1 | 5 |
| 5ESS | Audits | 2.5 | Asserts | 2.5 | | | 5 |
| DMS100 | SWERS | 3 | TRAPS | 2 | | | 5 |
| DMS10 | XLT | 1 | BUG | 2 | AUD | 2 | 5 |
| DCO | CPE Message | 0 | | | | | 0 |
| EWSD | CP Int Audit | 3 | CP-LTG Inter Proc errors | 2 | | | 5 |
| SS7 | MTP_RTE_Fail | 10 | RS_Unaval | 15 | SCCP_RTE_FAIL | 15 | 40 |
| AIN | MTP_RTE_Fail | 10 | SCCP_RTE_FAIL | 10 | | | 20 |

Referring to Table 6B, it is noted that about ninety percent of software errors represent a lost or blocked call. These software errors could involve situations in which a customer was misrouted, a customer had to redial, a customer was billed incorrectly, or one of the customer's subscribed service features did not work correctly. NRC 370 either corrects the error or refers it to NISC 360 with analysis information to facilitate correction by NISC 360. The objective of this measurement is two fold: first, perform the correction timely; and second, perform accurate analysis to reduce blocked calls.

TW02 count/call volume=results (results=TW02 index and TW02 points)

1AESS software points=(audit points+DB00 points+TW02 points)

1AESS software index=((60% audit index)+(20% DB00 index)+(20% TW02 index))

This measurement is shared between NRC 370 and the NISC 360.

Table 6C represents the various types of failures that make up Processor Initializations and Peripheral Initializations for the different network elements and the maximum points available assuming a perfect score.

TABLE 6C

Processor and Peripheral Performance

| Elements | Processor Initializations | Points | Peripheral Initializations | Points | Total |
|---|---|---|---|---|---|
| 1AESS | Phase (1–6), Interrupts (A–E) | 10 | F-Level Interrupts | 10 | 20 |
| 5ESS | AM Auto FI, SI, FPI; AM Man FI, SI, FPT; AM Interrupts | 10 | SM Auto FI, SI; SM Man FI, SI; CMP Auto FI, SI; CMP Man FI, SI; SM Interrupts | 10 | 20 |
| DMS100 | Initialization = 7 points Transient Errors = 3 points | 10 | Initialization | 10 | 20 |
| DMS 10 | Initialization = 7 points Transient OVLD 400 = 1 point Transient OVLD 990 = | 10 | Not Available | 0 | 10 |

TABLE 6C-continued

Processor and Peripheral Performance

| Elements | Processor Initializations | Points | Peripheral Initializations | Points | Total |
|---|---|---|---|---|---|
| DCO | 1 point Transient OVLD 991 = 1 point Auto CP Restore, Auto CPSU, CBC Restart, FP Reboot, MP Reboot | 21.25 | Auto LSC Download, LSC Restart | 21.25 | 42.5 |
| EWSD | Newstart (0–3), Initialstart (1–2), Initialstart (2R, 2G, 2E) | 20 | LTG Recovery | 20 | 40 |
| SS7 | MTP_RTE_FAIL = 10 points RS_UNAVAL = 15 points SCCP_RTE_FAIL = 15 points | 40 | Not Applicable | 0 | 40 |
| AIN | MTP_RTE_FAIL = 10 points SCCP_RTE_FAIL = 10 points | 20 | Not Applicable | 0 | 20 |

Referring to Table 6C, the terms "restart" and "initialization" are synonymous. A "restart" is a measure of lost/blocked calls and/or customer reports. Restarts are divided into two components, Peripheral Restarts and Processor Restarts.

Processor restarts have a higher weighting since they impact service to all customers in the switch. Processor restarts are not a normal occurrence except during planned activity.

Peripheral restarts normally affect customers assigned in the equipment or calls using that equipment at the time of the restart. Peripheral restarts are much less severe than processor restarts since they impact fewer customers. Peripheral restarts are not a normal occurrence, that is they should not occur when everything is performing as designed. These restarts are generated by many switch vendors in an attempt to correct a switch detected irregularity. Peripheral restarts are usually the results of a maintenance problem.

Both components can be impacted through pro-active trend analysis.

Table 6D lays out the various different type of network faults for each network element type. It shows the maximum possible points for each network fault type and the total points for the network fault category per network element type. The elements column shows the different network element types used in the network. The network fault column shows the different network faults per network element type. The points column shows the maximum points available for each network fault type, and the total column shows the total points available for the network fault category for each network element type.

TABLE 6D

Network Faults

| Elements | Network Fault Type | Points | Total |
|---|---|---|---|
| 1AESS | Cutoffs | 7 | 30 |
|  | FSCNS | 9 |  |
|  | SUP & FCG | 9 |  |
|  | RVFY | 2.5 |  |
|  | NN10 Errors | 2.5 |  |
| 5ESS | Cutoffs | 10 | 30 |
|  | No Path | 5 |  |

TABLE 6D-continued

Network Faults

| Elements | Network Fault Type | Points | Total |
|---|---|---|---|
|  | ONTC Faults | 5 |  |
|  | SM/ONTC TS Mismatch | 5 |  |
|  | Other Faults | 5 |  |
| DMS100 | SPMS Cutoffs | 25 | 30 |
|  | Net INTEG Count | 5 |  |
| DMS10 | Path Continuity Failure | 15 | 30 |
|  | Network Parity Failure | 10 |  |
|  | Peripheral Card Response Failure | 5 |  |
| DCO | To be determined | 0 | 0 |
| EWSD | To be determined | 0 | 0 |
| SS7 | Not Applicable |  |  |
| AIN | Not Applicable |  |  |

Referring to Table 6D, network faults are selected since they represent a lost call or the potential for a lost call. Two categories are selected. Network fault lost calls and other. The lost call category is a heavily weighted component since these failures are associated with a call that died in the switch and 95% of the time the customer received a Reorder at 120 IPM (interruptions per minute). Reorder is a tone that the customer receives when a call attempts fails. It is very similar to a busy signal, which is a tone at 60 IPM. The remaining 5% of the time the customer receives an announcement.

The other category counts first trial failures and/or network problems that if left alone would deteriorate into lost calls. These calls were processed and did not result in a lost call.

Table 6E represents the maximum points available for Central Office Equipment Code5's by network element type. Central Office Equipment Code5 represents customer reports of trouble that were eventually proven to be caused by a switch's central office equipment.

TABLE 6E

Code 5s Central Office Equipment

| Elements | Points |
|---|---|
| 1AESS | 15 |
| 5ESS | 15 |
| DMS100 | 15 |
| DMS10 | 25 |
| DCO | 15 |
| EWSD | 15 |
| SS7 | 15 |
| AIN | 10 |

Table 6E shows for each network element the maximum points available for Central Equipment Code5's per network element type. The formula for calculating code5's is Ratio (or Results)=Number of Code5's/Total Mainstations. Total Mainstations means the total working lines in the switch. The ratio is used to consult component index table to determine its component index. The component index is multiplied by the maximum points available to determine the points received. As an example if a switch experienced 1,500 Central Office Equipment Code5's and had a total of 25,000 mainstations. Then the ratio is 1,500/25,000=0.06. From Table 6E1 below, which is an exemplary component index table, the ratio of 0.06 is between performance low (Perf_LO) of 0.053 and performance high (Perf_HI) of 0.106, which corresponds with a component index of 0.99, and a component score or component point of 14.85 (0.99× 15). Since Code5's is a customer report item, the number of customer trouble reports can be retrieved from a system or a computer program that tracks customer trouble reports or Code5's. One example of the system is generally known as the MTAS. Performance data associated with Code5's can be collected daily, weekly or monthly.

TABLE 6E1

An Exemplary Component Index Table

| Element | Component | Perf_LO | Perf_HI | Component Index | Points |
|---|---|---|---|---|---|
| 1AESS | Code_5 | −0.01 | 0.053 | 1.00 | 15.00 |
| 1AESS | Code_5 | 0.053 | 0.106 | 0.99 | 14.85 |
| 1AESS | Code_5 | 0.106 | 0.159 | 0.98 | 14.70 |
| 1AESS | Code_5 | 0.159 | 0.212 | 0.97 | 14.55 |
| 1AESS | Code_5 | 0.212 | 0.265 | 0.96 | 14.40 |
| 1AESS | Code_5 | 0.265 | 0.318 | 0.95 | 14.25 |
| 1AESS | Code_5 | 0.318 | 0.371 | 0.94 | 14.10 |

A component index table, such as Table 6E1, can be developed based on historical data associated with elements 320 and 330 in network 300.

Table 6F represents the items that outage is collected in SS7 network. Typically, an SS7 network element is an STP. The subsystems shown in Table 6F below are all of the different processors.

TABLE 6F

SS7 Subsystem Unavailable

| Element | Subsystem Unavailable | Points | Total |
|---|---|---|---|
| SS7 | Admin Processor, IPR Processor, TMM Processor, Comm. Processor, CCM Processor, CCD Processor, MTNC Processor, and Alarm Processor | 5 | 5 |

In Table 6F, the Element column represents the network element type. In this case it is only SS7. The equipment included in the Subsystem Unavailable component, the points available, and the total points available for Subsystem Unavailable.

Table 6G represents the components and the points available for the AIN network element type. These include SCP Isolation, indicating an AIN network element being isolated from the rest of the network and Link Congestion showing load balance on the AIN network element links connecting it to the rest of the network.

TABLE 6G

AIN Measures

| Component | Points | Total |
|---|---|---|
| SCP Isolation | 20 | 20 |
| Link Congestion | 10 | 10 |

TABLE 7

Total Points from Tables 6A–6G

| | Tables | | | | | | | |
|---|---|---|---|---|---|---|---|---|
| Elements | 6A | 6B | 6C | 6D | 6E | 6F | 6G | Total |
| 1AESS | 30 | 5 | 20 | 30 | 15 | 0 | 0 | 100 |
| 5ESS | 30 | 5 | 20 | 30 | 15 | 0 | 0 | 100 |
| DMS100 | 30 | 5 | 20 | 30 | 15 | 0 | 0 | 100 |
| DMS10 | 30 | 5 | 10 | 30 | 25 | 0 | 0 | 100 |
| DCO | 42.5 | 0 | 42.5 | 0 | 15 | 0 | 0 | 100 |
| EWSD | 40 | 5 | 40 | 0 | 15 | 0 | 0 | 100 |
| SS7 | 20 | 40 | 40 | 0 | 15 | 5 | 0 | 100 |
| AIN | 20 | 20 | 20 | 0 | 10 | 0 | 30 | 100 |

Table 7 summarizes the points assigned to each failure of the elements. Note that the total point for each element is 100 as shown in the far right column. Any failure experienced by an element will result in an associated point to be subtracted from the total of 100 points.

Returning to FIG. 4, in step 408, a collection program is provisioned at each of the elements from which performance data is to be collected. As there are as many as 1,000 elements in the network, as many as 1,000 collection programs will be provisioned. For the system shown in FIG. 3, exemplary collection programs 322 and 332 are provisioned at exemplary elements 320 and 330, respectively.

In step 410, collection programs 320 and 330 monitor the performance of elements 320 and 330, respectively.

In step 412, as elements 320 and 330 operate within telephone network 300, elements 320 and 330 generate performance data, and the performance data is collected by collection programs 322 and 322, respectively. The performance data is provided to microprocessor 310 to be stored in database 312.

In step 414, using a lookup table, such as those shown in Tables 6A through 6G above, microprocessor 310 associates points with failures encountered by the elements based on the performance data received.

In step 416, a network health index is calculated for each element whose performance data has been collected and processed by microprocessor 310.

In preferred embodiments of the invention, monthly network health indices can be computed for the elements if there are at least 15 days of data (both failures and base counts) and there are at least 50% of the elements reporting. A network health index for an element can be computed by dividing the total points earned by the total points possible.

If a component of the element is not reporting or the component score associated with that component is not available, then that component's maximum component points are not included in the total element points. As an example if Code 5's (15 points) did not report, then the total possible points or overall network health score would be 85 and the formula would be total points earned divided by 85. Network elements not having 50% of their components reporting will be excluded.

In this embodiment, the overall network health score for the network element is used to calculate the element's network health index. For example, the network health index for a 1AESS switch can be calculated as tabulated in Table 8 below.

TABLE 8

An Exemplary Calculation of An Element

| Categories | Sub-categories | Components | Maximum Points | Earned Points |
|---|---|---|---|---|
| Equipment out of service | | Processor > 24 hours | 15 | 14.85 |
| | | Peripheral > 72 hours | 10 | 9 |
| | | Deferred equipment | 5 | 3 |
| Software errors | | Audits | 3 | 2 |
| | | TW02 | 1 | 1 |
| | | DB00 | 1 | 0 |
| Processor initialization | | Processor initialization | 10 | 8 |
| Peripheral initialization | | Peripheral initialization | 10 | 7 |
| Network faults | Lostcalls | Cutoff | 7 | 7 |
| | | FSCNS | 9 | 8.5 |
| | | SUP & FCG failures | 9 | 8.2 |
| | Other | RVFY | 2.5 | 2 |
| | | NN10 errors | 2.5 | 2.1 |
| Code 5s | | Code 5s | 15 | 15 |
| central office equipment | | | | |
| Overall Score | | | 100 | 87.65 |
| Network Health Index | 87.65/100 = 0.8765 | | | |

It is noted that the Earned Points column represents the component scores over a measuring period for the exemplary 1AESS switch. The Network Health Index at the bottom of Table 8 represents the overall performance of this switch over the measuring period.

In step 418, the network health index is reported to one or more of FWG 350, NISC 360, NRC 370, INTS 380, and external systems 390.

Preferably, deductions to the network health indicator (network health score and network health index) can be reviewed and approved by technology specialists of NRC 370. An event (initiations, restart, etc.) can only be deducted if it is related to a planned maintenance activity (e.g., software load, growth, retrofit, etc.) and it is known (prior to the activity) that the event will occur. It should be documented in an approved Method of Procedure (MOP) that the event will occur. There must be a network activity tracking system (NATS) report on file prior to the activity and it must be entered in the Regional Technical Support Group (RTSG) ticket database with a planned maintenance ticket. Unexpected maintenance events (initiations, restarts, etc.) that occur in conjunction with planned activity but are not part of a MOP, cannot be deducted.

Preferably, historical data on each measurement can be exported to a statistical analysis software program, normalized using statistical process control (SPC) principles so that special cause data points are excluded. The normalized data will then be converted to SPC charts with the mean and control limits defined for each component for each switch type. Different switch types will not be mixed in any measurement category. Once the control limits and mean are established index points will be assigned using this data and the ORACLE database will be populated. The index points will be used to generate total points and a grade for a particular category. This enables a total index to be derived for a turf, area, or region. The control limits will also be used to generate daily exception reports.

Preferably, all data will be collected daily and control limits will be reviewed on a quarterly basis or as needed.

Preferably, data collection for most network elements starts in the TSM by collecting data from the individual network element logging channels via patterns and schedule from an automatic scheduling program in the processors. However, it is then passed off to the NRC server for storage in an Oracle Database and the time consuming process of calculating an index is done on the server. The Oracle database stores two months worth of daily data from the individual network elements. That is all of last month, and this month (Month to Date). It also stores last months-calculated index and this months-calculated index (Month to Date).

Preferably the network health index can be made available on the web giving every manager instant up to date data with the click of a mouse from his personal computer. The web pages will be drilled down, giving the manager data from company wide down through the Turf level to an individual network element. The website is programmed utilizing the "Macromedia Cold Fusion" software product. This software and programming enables dynamic data to be presented on a website. The data that is entered to the database is accessible instantly to all users.

In describing representative embodiments of the invention, the specification may have presented the method and/or process of the invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the invention should not be limited to the performance of their steps in the order written, and one skilled in the art can readily appreciate that the sequences may be varied and still remain within the spirit and scope of the invention.

The foregoing disclosure of the embodiments of the invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

We claim:

1. A method for determining service requirements for network elements comprising the steps of:

collecting performance data from at least one component of one or more switch elements of a network for which service requirements are desirable by an entity, wherein performance data comprises a component score for each component, wherein further a component score comprises a ratio with a component failure rate as the numerator and a component base count as the denominator, the performance data for each switch comprising out of service data, software error data, processor and peripheral performance data, network fault data, code 5s central office equipment data, SS7 subsystem unavailable data, and AIN Measures data;

processing the performance data to calculate a network health indicator for each of the one or more elements wherein the component scores for each component of an element are weighted by a factor and totaled, wherein further the maximum network health indicator for an element is the total of all the maximum theoretical component scores;

saving the performance data to a database;

comparing the network health indicator for each of the one or more elements to a graduated service schedule to determine the service requirement for each of the one or more elements, wherein the graduated service schedule comprises a plurality of ranges of network heath scores each range associated with a health category and a service requirement, the plurality of ranges comprising a first range indicative of no service being required, a second range indicative of service needed within the next week, a third range indicative of service needed within the next three days, a fourth range indicative of service needed within the next day, and a fifth range indicative of service needed immediately; and generating one or more trouble tickets and exception reports, wherein the trouble tickets and reports are determined by the resulting service requirement and prioritized according to the network healthy indicator of the associated element.

2. The method of claim 1, wherein the performance data is collected by a collection program associated with each of the one or more elements.

3. The method of claim 1, wherein the performance data is collected by a collection program that is part of a host computer which is in communication with each of the one or more elements.

4. The method of claim 1, wherein the performance data is processed by a microprocessor adapted to calculate the network health indicator based on a network health assessment scheme.

5. The method of claim 1, wherein the network health indicator is related to the service requirement by a lookup table.

6. The method of claim 1, further comprising the step of storing the performance data for a measuring period before the network health indicator is calculated.

7. The method of claim 6, wherein the performance data is stored in a database accessible by a microprocessor, and wherein the microprocessor calculates the network health indicator at the end of the measuring period.

8. The method of claim 1, further comprising the step of comparing two or more network health indicators associated with two or more elements to determine a service priority among the two or more elements.

9. A method for determining service requirements of network elements comprising the steps of:

developing at least one network health assessment schemes for one or more elements in a network for which service requirements are desirable by an entity, wherein the network health assessment schemes further comprise the steps of:

collecting performance data from the one or more elements in accordance with the network health assessment schemes, the performance data for each switch comprising out of service data, software error data, processor and peripheral performance data, network fault data, code 5s central office equipment data, SS7 subsystem unavailable data, and AIN Measures data;

calculating a network health indicator, ranging from a minimum score to a maximum score, for each of the one or more elements by using the performance data in accordance with the network health assessment schemes;

comparing the resulting network health indicator(s) for the one or more elements to a plurality of possible service requirements for the one or more elements in accordance with the network health assessment schemes, the network health indicators falling into one of a plurality of ranges, the plurality of ranges comprising a first range indicative of no service being required, a second range indicative of service needed within the next week, a third range indicative of service needed within the next three days, a fourth range indicative of service needed within the next day, and a fifth range indicative of service needed immediately; and determining the service requirement required by the one or more elements as indicated by the network health indicator.

10. The method of claim 9, wherein the network health assessment schemes are based at least in part on failures experienced by the one or more elements.

11. The method of claim 10, wherein each of the failures is associated with one or more points, and wherein the one or more points are subtracted from a perfect score to calculate the network health indicator.

12. The method of claim 9, wherein the network health indicator is calculated based on a ratio of the failures to attempts made by the one or more elements.

13. The method of claim 9, further comprising the step of comparing two or more network health indicators associated with two or more elements to determine which of the two or more elements requires service most urgently.

14. The method of claim 13, wherein an element having the lowest network health indicator receives a priority for service.

15. The method of claim 9, wherein each of the network health assessment schemes comprises a lookup table relating network health indicators to service requirements.

16. The method of claim 15, wherein the service requirements of the one or more elements are compared to determine service priorities among the one or more elements.

17. A system for determining service requirements of elements in a telephone network comprising:

one or more elements in the telephone network for which service requirements are desirable by an entity affiliated with the telephone network, wherein each of the one or more elements is adapted to generate performance data related to failures it experiences;

a collection program associated with each of the one or more elements, wherein the collection program is adapted to collect the performance data, the performance data for each switch comprising out of service data, software error data, processor and peripheral performance data, network fault data, code 5s central office equipment data, SS7 subsystem unavailable data, and AIN Measures data; and a microprocessor in communication with the collection program, wherein the microprocessor is adapted to retrieve the performance data from the collection program at the end of a measuring period, wherein the microprocessor processes the performance data at the end of the measuring period to calculate a network health indicator ranging between a minimum score and a maximum score, inclusive, for each of the one or more elements, individually or in combination, in accordance with a network health assessment scheme, wherein the network health indicator is compared to a plurality of predetermined score ranges indicating a plurality of heath ranges and the level of service required, the plurality of ranges comprising a first range indicative of no service being required, a second range indicative of service needed within the next week, a third range indicative of service needed within the next three days, a fourth range indicative of service needed within the next day, and a fifth range indicative of service needed immediately.

18. The system of claim 17, further comprising a database, wherein the database is adapted to store the performance data collected by the collection program.

19. The system of claim 17, wherein the performance data includes one or more of equipment out of service, software errors, processor and peripheral performance, network faults, code 5, SS7 subsystem unavailability, and AIN measures.

20. The system of claim 17, wherein the network health assessment scheme uses a score system involving subtracting points associated with failures experienced by the elements from a perfect score of 100.

21. The system of claim 17, wherein the network health assessment scheme uses a lookup table, wherein the lookup table associates a service requirement of an element with a ratio of failures to attempts of the element.

22. The system of claim 17, wherein the microprocessor is adapted to compare two or more service requirements associated with two or more elements to determine which of the two or more elements has a priority.

23. A method for determining service requirements of elements of a telephone network comprising the steps of:
developing a network health assessment scheme for one or more elements in the telephone network for which service requirements of the elements are desirable by an entity affiliated with the telephone network, wherein the network health assessment schemes further comprise the steps of:
collecting performance data from each of the one or more elements in accordance with the network health assessment schemes, the performance data for each switch comprising out of service data software error data, processor and peripheral performance data, network fault data, code 5s central office equipment data, SS7 subsystem unavailable data, and AIN Measures data;
processing the performance data from the one or more elements to calculate a network health indicator for each element, ranging from minimum score to a maximum score, in accordance with the network health assessment scheme;
relating the resulting network health indicator(s) for the one or more elements to a plurality of possible service requirements for the one or more elements in accordance with the network health assessment schemes, the network health indicators falling into one of a plurality of ranges, the plurality of ranges comprising a first range indicative of no service being required, a second range indicative of service needed within the next week, a third range indicative of service needed within the next three days, a fourth range indicative of service needed within the next day, and a fifth range indicative of service needed immediately;
determining the service requirement required by the one or more elements as indicated by the network health indicator; and
providing the service requirement to the entity.

24. The method of claim 23, wherein the network health assessment scheme is based at least in part on one or more performance data types.

25. The method of claim 24, wherein the one or more performance data types are equipment out of service, software errors, processor and peripheral performance, network faults, code 5, SS7 subsystem unavailability, and AIN measures.

26. The method of claim 24, wherein the network health assessment scheme is based at least in part on failures experienced by the one or more elements in the one or more performance data types.

27. The method of claim 26, wherein each of the failures is associated with one or more points, and wherein the one or more points are subtracted from a perfect score to calculate the network health indicator.

28. The method of claim 23, further comprising the step of comparing two or more network health indicators associated with two or more elements to determine which of the two or more elements has a service priority over the remaining elements.

29. A system for determining service requirements of network elements comprising:
means for collecting performance data from at least one component of one or more elements of a network for which service requirements are desirable by an entity, wherein performance data comprises the component scores for each component, the performance data for each switch comprising out of service data, software error data, processor and peripheral performance data, network fault data, code 5s central office equipment data, SS7 subsystem unavailable data, and AIN Measures data;
means for processing the performance data to calculate a network health indicator for each of the one or more elements wherein the component scores for each component of an element are weighted by a factor and totaled, wherein further the maximum network health indicator for an element is the total of all the maximum theoretical component scores; and
means for comparing the network health indicator to a graduated service schedule to determine the service requirement for each of the one or more elements, the network health indicator falling into one of a plurality of ranges, the plurality of ranges comprising a first range indicative of no service being required, a second range indicative of service needed within the next week, a third range indicative of service needed within the next three days, a fourth range indicative of service needed within the next day, and a fifth range indicative of service needed immediately.

30. The system of claim 29, wherein the collecting means is a collection program associated with each of the one or more elements.

31. The system of claim 29, wherein the collecting means is a collection program that is part of a host computer which is in communication with each of the one or more elements.

32. The system of claim 29, wherein the processing means is a microprocessor adapted to calculate the network health indicator based on a network health assessment scheme.

33. The system of claim 29, wherein the relating means involves a lookup table that associates the network health indicator with the service requirement.

34. The system of claim 29, further comprising means for storing the performance data for a measuring period before the network health indicator is calculated.

35. The system of claim 34, wherein the storing means is a database accessible by the processing means, and wherein the processing means calculates the network health indicator at the end of the measuring period.

36. The system of claim 29, further comprising means for comparing two or more network health indicators associated with two or more elements to determine a service priority among the two or more elements.

* * * * *